(12) United States Patent
Ito et al.

(10) Patent No.: US 12,087,324 B2
(45) Date of Patent: Sep. 10, 2024

(54) BASE PLATE, SPINDLE MOTOR AND DISK DRIVE

(71) Applicant: NIDEC CORPORATION, Kyoto (JP)

(72) Inventors: Michihiro Ito, Kyoto (JP); Ryo Furuya, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 3 days.

(21) Appl. No.: 17/673,717

(22) Filed: Feb. 16, 2022

(65) Prior Publication Data

US 2022/0262399 A1 Aug. 18, 2022

(30) Foreign Application Priority Data

Feb. 18, 2021 (JP) ................. 2021-024674

(51) Int. Cl.
 *G11B 33/02* (2006.01)
 *G11B 19/20* (2006.01)
 *H02K 5/16* (2006.01)

(52) U.S. Cl.
 CPC ......... *G11B 19/2009* (2013.01); *H02K 5/165* (2013.01)

(58) Field of Classification Search
 None
 See application file for complete search history.

(56) References Cited

U.S. PATENT DOCUMENTS

| | | | | |
|---|---|---|---|---|
| 7,961,426 B2 * | 6/2011 | Naruse | ................. | G11B 25/043 360/99.2 |
| 9,336,817 B1 * | 5/2016 | Hirasawa | ............. | G11B 25/043 |
| 9,990,959 B1 * | 6/2018 | Ito | ......................... | G11B 25/043 |
| 10,102,882 B1 * | 10/2018 | Ino | ........................ | G11B 5/4813 |
| 2012/0250184 A1 * | 10/2012 | Inoue | .................... | G11B 25/043 29/603.03 |
| 2015/0108884 A1 * | 4/2015 | Thieman | ................ | B22D 17/12 164/312 |
| 2019/0093234 A1 * | 3/2019 | Sakurada | ................ | C25D 13/22 |
| 2019/0139579 A1 * | 5/2019 | Yoneda | .................. | G11B 23/38 |
| 2019/0267044 A1 * | 8/2019 | Yoshimura | ........... | G11B 33/121 |
| 2020/0185003 A1 * | 6/2020 | Ino | ........................ | G11B 33/121 |
| 2022/0068305 A1 * | 3/2022 | Showa | ................. | G11B 25/043 |
| 2022/0130428 A1 * | 4/2022 | Suzuki | ................. | G11B 33/022 |
| 2022/0262399 A1 * | 8/2022 | Ito | ........................ | G11B 33/022 |

FOREIGN PATENT DOCUMENTS

JP 2015127064 7/2015

* cited by examiner

*Primary Examiner* — William J Klimowicz

(74) *Attorney, Agent, or Firm* — JCIPRNET (57) ABSTRACT

A base plate includes a base body including a bottom plate and a pivot post, and an electrodeposition coating film. The bottom plate extends perpendicular to a first axis, a rotation axis of the disk, and a second axis, a swing axis of a head; and, when viewed from an axial direction, has a rectangular shape with a first direction as a short side direction and a second direction as a long side direction. The pivot post protrudes upward from an upper surface of the bottom plate at a position overlapping the second axis. The bottom plate has a thin bottom arranged in a radially outward direction orthogonal to the second axis of the pivot post and including at least one of a lower recess recessed upward from a lower surface of the bottom plate and an upper recess recessed downward from the upper surface of the bottom plate.

15 Claims, 10 Drawing Sheets

FIG. 10

BASE PLATE, SPINDLE MOTOR AND DISK DRIVE

CROSS-REFERENCE TO RELATED APPLICATIONS

The present invention claims priority under 35 U.S.C. § 119 to Japanese Application No. 2021-024674 filed on Feb. 18, 2021, the entire content of which is incorporated herein by reference.

BACKGROUND

Field of the Invention

The present disclosure relates to a base plate, a spindle motor and a disk drive.

Background

Conventionally, a disk drive such as a hard disk drive is known. The disk drive includes a spindle motor that rotates a disk, a head that reads and writes information to the disk, and the like. Components of the disk drive, such as the spindle motor and the head, are supported by a base plate. The conventional base plate has an actuator mounter. An actuator that moves the head is mounted on the actuator mounter. For example, the actuator mounter is called a pivot post.

A conventional base plate is formed by forging. However, in the past, it was common to form the base plate by casting. In the casting process of the base plate, a mold having a cavity corresponding to the pivot post is used. Molten metal is then poured into the mold.

Here, the cavity corresponding to the pivot post is an elongated cavity having a substantially columnar shape. Therefore, the cavity corresponding to the pivot post may not be sufficiently filled with the molten metal. In this case, shrinkage cavities may occur in the pivot post, which can reduce the quality of the base plate.

SUMMARY

An exemplary base plate of the present disclosure is a base plate of a cast product that is part of a housing of a disk drive and includes a base body and an electrodeposition coating film that covers at least part of a surface of the base body. The base body has a bottom plate and a pivot post. The bottom plate extends vertically and extends perpendicular to a first axis that is a rotation axis of a disk, and a second axis that extends vertically at a position different from the first axis and serves as a swing axis of a head that performs at least one of reading and writing information from/to the disk, and, when viewed from the axial direction, has a rectangular shape with a first direction as a short side direction in which a short side extends and a second direction as a long side direction in which a long side extends. The pivot post protrudes upward from an upper surface of the bottom plate at a position overlapping the second axis. The bottom plate includes a thin bottom. The thin bottom is arranged in a radially outward direction orthogonal to the second axis of the pivot post, and includes at least one of a lower recess that is recessed upward from a lower surface of the bottom plate and an upper recess that is recessed downward from the upper surface of the bottom plate.

The above and other elements, features, steps, characteristics and advantages of the present disclosure will become more apparent from the following detailed description of the preferred embodiments with reference to the attached drawings.

DETAILED DESCRIPTION

An exemplary embodiment of the present disclosure will be described with reference to the drawings.

In the present specification, a rotation axis of a disk 30 is referred to as a first axis A1, and a swing axis of a head 40 is referred to as a second axis A2. The first axis A1 and the second axis A2 are parallel to each other; the direction parallel to each of the first axis A1 and the second axis A2 is called "axial direction", and the axial direction is the vertical direction. That is, the first axis A1 and the second axis A2 extend vertically, respectively; one direction in the axial direction is called "above" and the other direction in the axial direction is called "below". Further, in each component, the surface facing above is referred to as "upper surface", and the surface facing below is referred to as "lower surface". This vertical definition does not limit the actual orientation and positional relationship of each component.

In the present specification, the direction orthogonal to the second axis A2 is referred to as "radial direction". Further, the direction away from the second axis A2 is referred to as "radially outward direction", and the direction closer to the second axis A2 is referred to as "radially inward direction".

In the present specification, one direction and the other direction orthogonal to each other when viewed from the axial direction are referred to as "first direction" and "second direction", respectively. In the present specification, a reference numeral D1 is applied to the first direction, and a reference numeral D2 is applied to the second direction.

Figure 1:
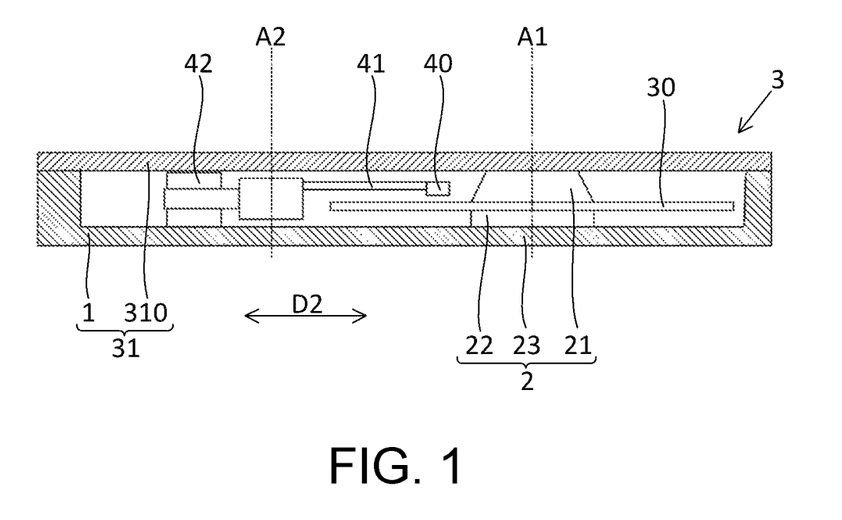
FIG. 1 is a schematic view showing an internal structure of a disk drive according to an embodiment.

FIG. 1 is a schematic view showing an internal structure of a disk drive 3 according to an embodiment.

The disk drive 3 is a hard disk drive. The disk drive 3 has the disk 30 as a storage medium. The disk 30 is arranged inside a housing 31 of the disk drive 3. The disk drive 3 performs at least one of reading and writing information from/to the disk 30 while rotating the disk 30 around the first axis A1.

The housing 31 is composed of a base plate 1 and a cover 310. The base plate 1 has a box shape with an opening. The cover 310 closes the opening of the base plate 1. Here, the inside of the housing 31 is filled with a gas having a density lower than air. The gas filled inside the housing 31 is, for example, helium gas.

The disk drive 3 includes a spindle motor 2. The disk 30 is fixed to the spindle motor 2. The spindle motor 2 rotates the disk 30 around the first axis A1. The spindle motor 2 has a rotator 21 and a stationary portion 22.

The rotator 21 is rotatable around the first axis A1. The rotator 21 has a hub and a shaft. The shaft is arranged at a position overlapping the first axis A1 and extends axially along the first axis A1. The shaft is rotatably supported around the first axis A1. The hub is fixed to the shaft and rotates with the shaft. The disk 30 is fixed to the hub.

The stationary portion 22 rotatably supports the rotator 21 around the first axis A1. The stationary portion 22 has a bearing and a stator. The bearing rotatably supports the rotator 21. The stator rotates the rotator 21 around the first axis A1.

The spindle motor 2 further has a base 23. The stationary portion 22 is fixed to the base 23. Here, the base 23 is part of the base plate 1. That is, the spindle motor 2 includes the base plate 1.

The disk drive 3 includes the head 40. Further, the disk drive 3 includes an arm 41 and a swinger 42. The head 40 is fixed to a tip of the arm 41. The arm 41 is swingably supported around the second axis A2. The swinger 42 swings the arm 41. The head 40 moves relative to the disk 30 by swinging around the second axis A2. The head 40 performs at least one of reading and writing information from/to the disk 30.

Figure 2:
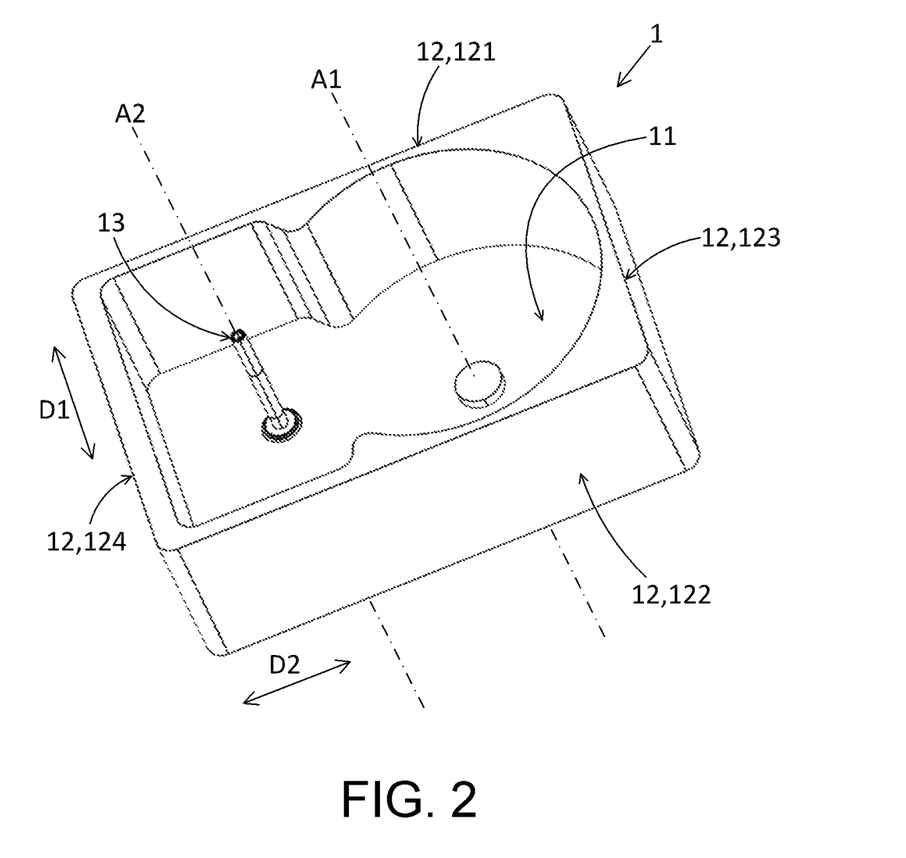
FIG. 2 is a perspective view of a base plate according to the embodiment as viewed from above.
Figure 3:
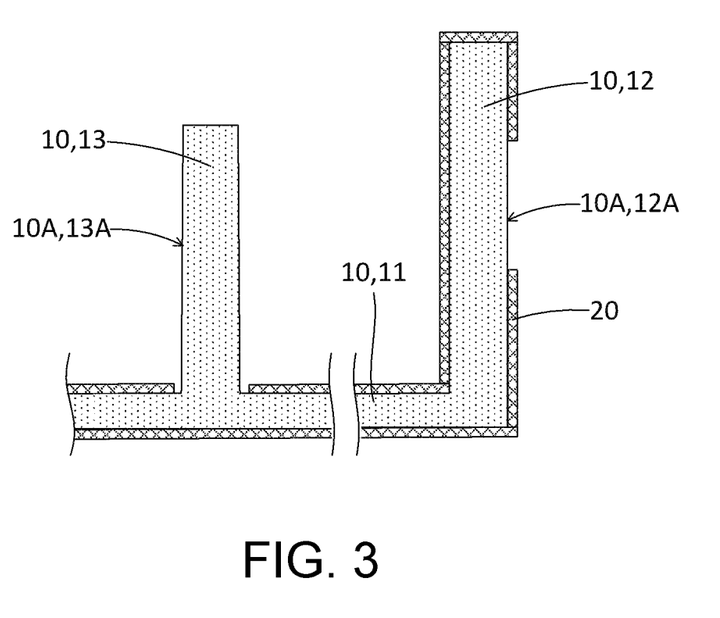
FIG. 3 is a schematic view showing the position of a processed surface of a base plate according to the embodiment.

FIG. 2 is a perspective view of the base plate 1 according to the embodiment as viewed from above. FIG. 3 is a schematic view showing the position of a processed surface 10A of the base plate 1 according to the embodiment. FIG. 3 is a diagram schematically showing a cross-sectional structure of a wall 12, a pivot post 13, and their surroundings.

The base plate 1 is part of the housing 31 of the disk drive 3. The base plate 1 is a cast product. For example, aluminum or aluminum alloy is used as the metal used as the material of the base plate 1.

The base plate 1 has a base body 10 and an electrodeposition coating film 20. The electrodeposition coating film 20 covers at least part of the surface of the base body 10 (see FIG. 3). However, the electrodeposition coating film 20 does not cover the entire surface of the base body 10. Part of the surface of the base body 10 is exposed from the electrodeposition coating film 20. In other words, the base body 10 has part of the surface on which the electrodeposition coating film 20 is not formed. Details will be described later. The electrodeposition coating film 20 may be, for example, an insulating film using an epoxy resin.

The base body 10 has a bottom plate 11. The bottom plate 11 extends perpendicular to the first axis A1 and the second axis A2. The first axis A1 extends vertically and servers as the rotation axis of the disk 30. The second axis A2 extends vertically at a position different from that of the first axis A1 and serves as a swing axis of the head 40 that performs at least one of reading and writing information from/to the disk 30.

The bottom plate 11 has a rectangular shape when viewed from the axial direction. Specifically, in the bottom plate 11, when viewed from the axial direction, the first direction D1 is the short side direction in which the short side extends, and the second direction D2 is the long side direction in which the long side extends.

The base body 10 has the wall 12. The wall 12 extends upward from an outer edge of the bottom plate 11. In the present specification, the inside of the region surrounded by the wall 12 is defined as the inside, and the outside of the region surrounded by the wall 12 is defined as the outside when viewed from the axial direction. A side surface of the wall 12 facing outward is referred to as an "outer surface".

The wall 12 has a first long side wall 121, a second long side wall 122, a first short side wall 123, and a second short side wall 124. The first long side wall 121 is located on one side of the first direction D1. The second long side wall 122 is located on the other side of the first direction D1. Further, the first short side wall 123 is located on one side of the second direction D2. The second short side wall 124 is located on the other side of the second direction. The first axis A1 is located further toward one side of the second direction D2 than is the second axis A2. In other words, the second axis A2 is located further toward the other side of the second direction D2 than is the first axis A1. Therefore, the disk drive 3 has the rotation axis of the disk 30 on the first short side wall 123 side and the swing axis of the head 40 on the second short side wall 124 side.

The base body 10 has the pivot post 13. The pivot post 13 protrudes upward from an upper surface of the bottom plate 11 at a position overlapping the second axis A2. In other words, the pivot post 13 extends axially to one side along the second axis A2. For example, the pivot post 13 has a circular shape when viewed from the axial direction. After casting, the pivot post 13 is processed. At the time before processing, the pivot post 13 has a shape that tapers from below to above. That is, at the time before processing, the pivot post 13 has a draft.

The arm 41 of the head 40 is attached to the pivot post 13 and swings around the second axis A2. For example, the arm 41 is attached via a bearing to the pivot post 13.

The first axis A1 is located further toward one side of the second direction D2 than is the second axis A2. In other words, the first axis A1 is located further toward one side of the second direction D2 than is the pivot post 13. That is, the pivot post 13 is located further toward the other side of the second direction D2 than is the first axis A1.

Figure 4:
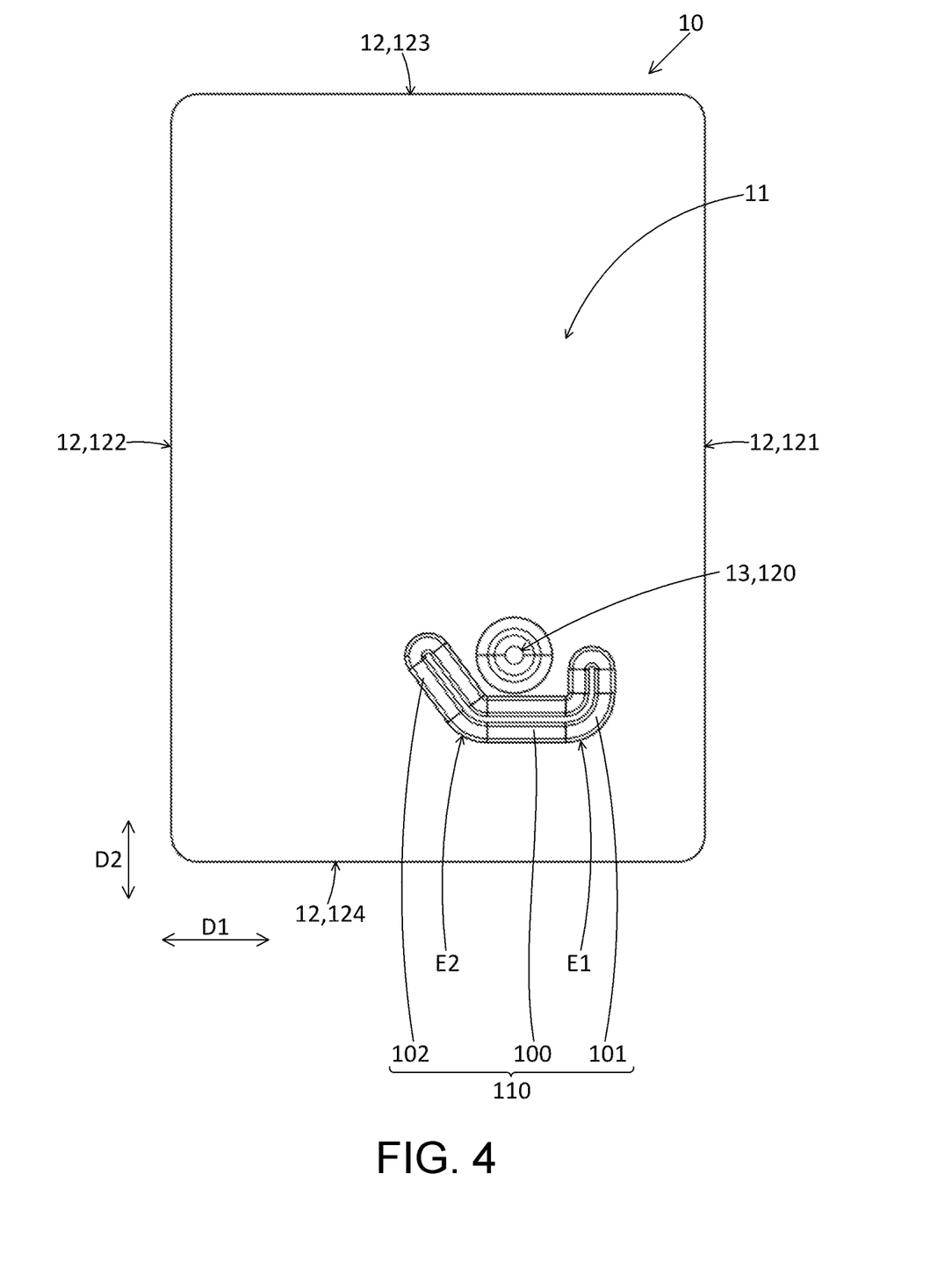
FIG. 4 is a plan view of a bottom plate of a base body according to the embodiment as viewed from below.
Figure 5:
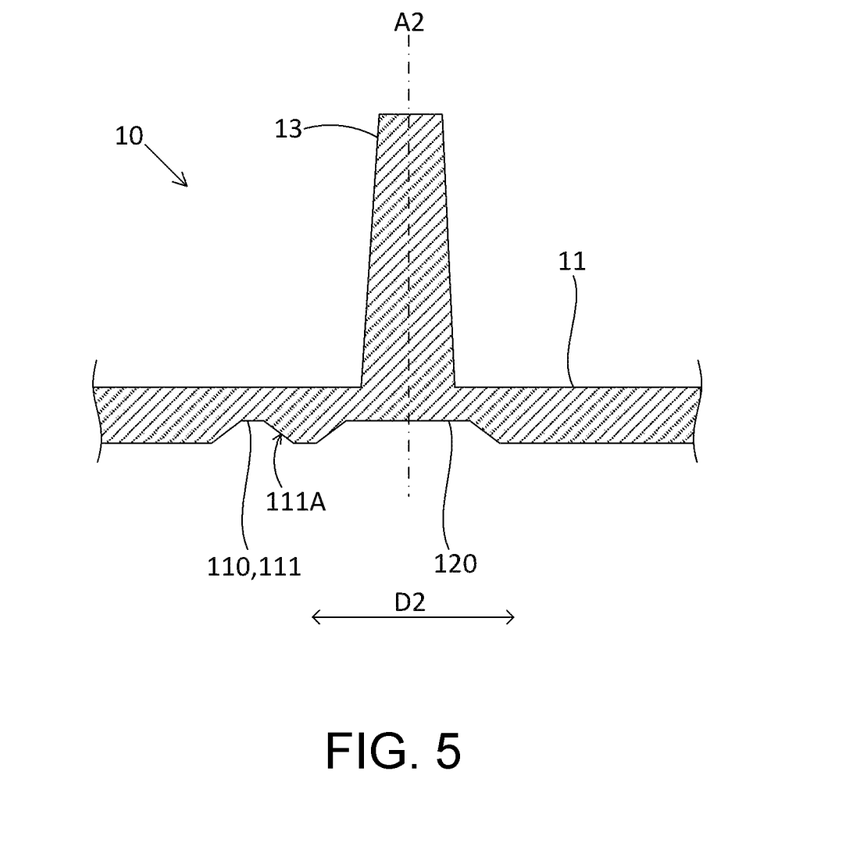
FIG. 5 is a cross-sectional view of a pivot post and its surroundings according to the embodiment.
Figure 6:
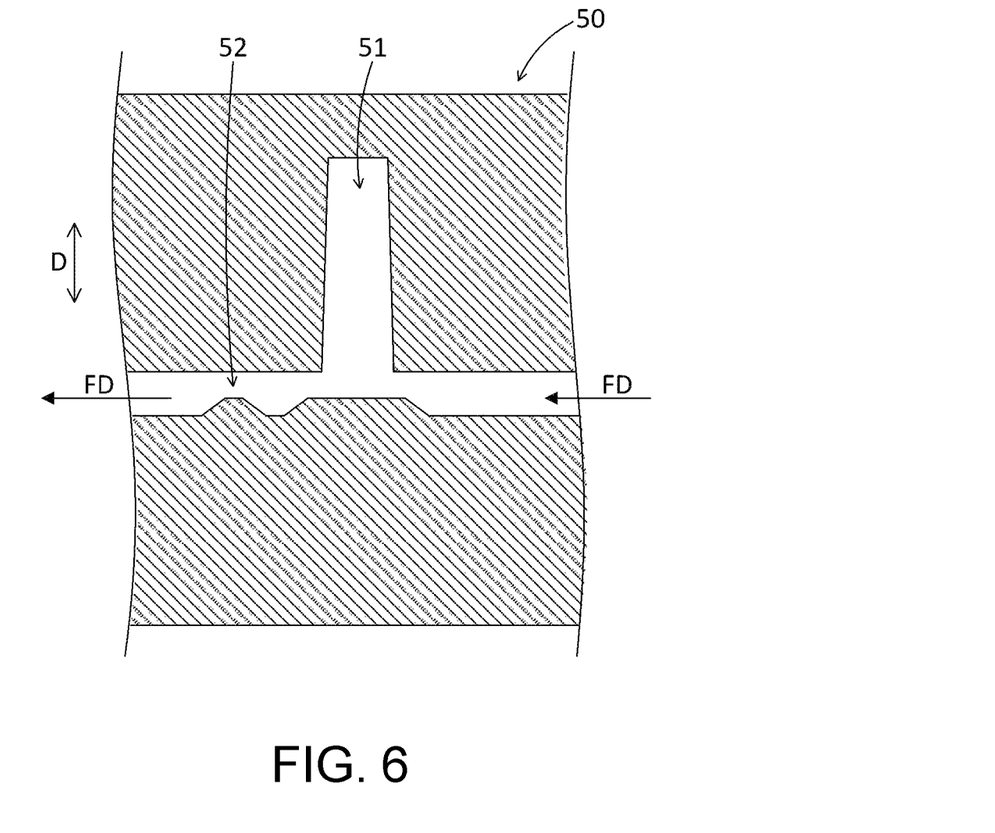
FIG. 6 is a cross-sectional view of a mold used in a casting process of a base plate according to the embodiment.
Figure 7:
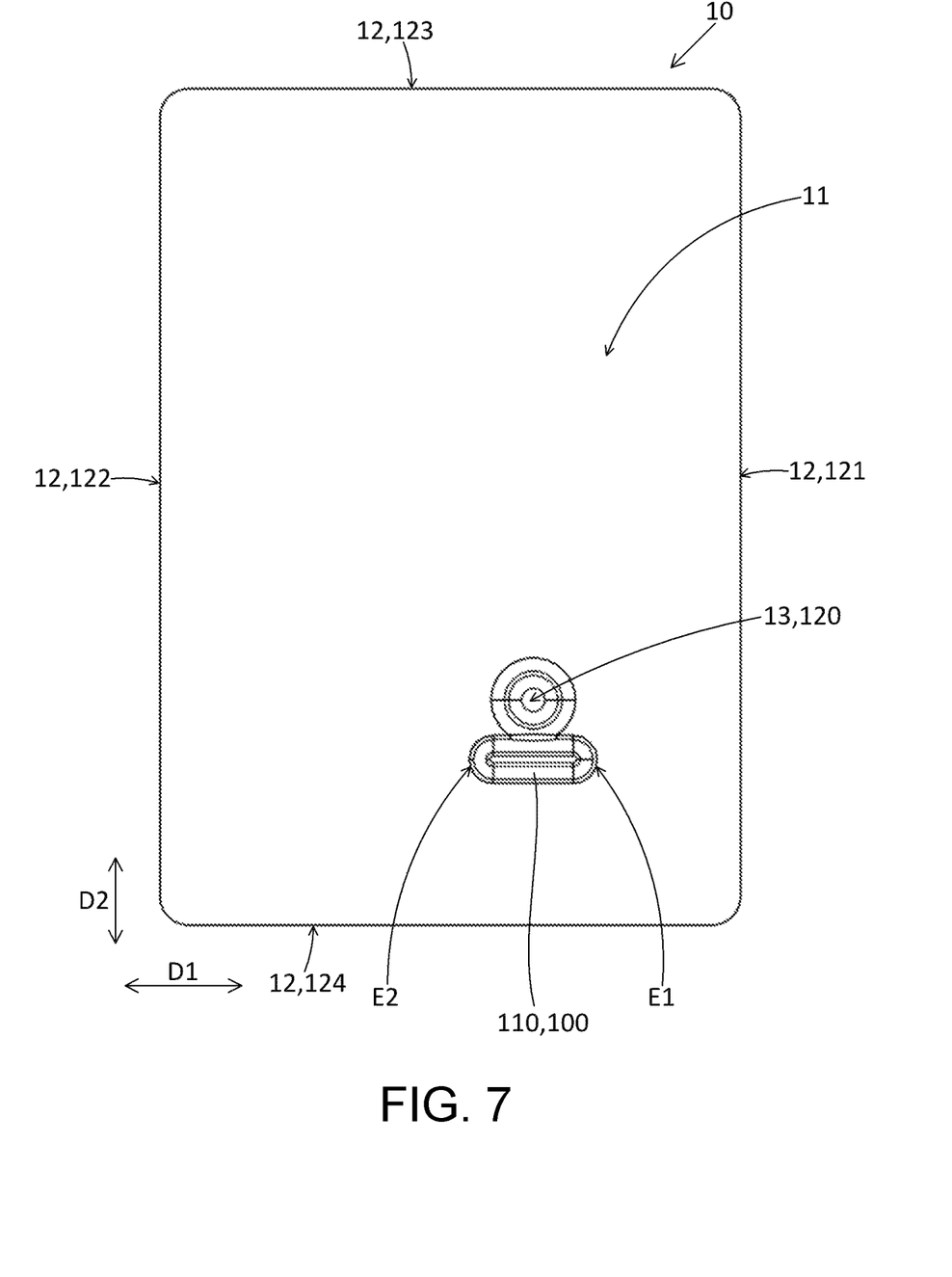
FIG. 7 is a diagram showing a planar shape of a thin bottom composed of only a trunk.
Figure 8:
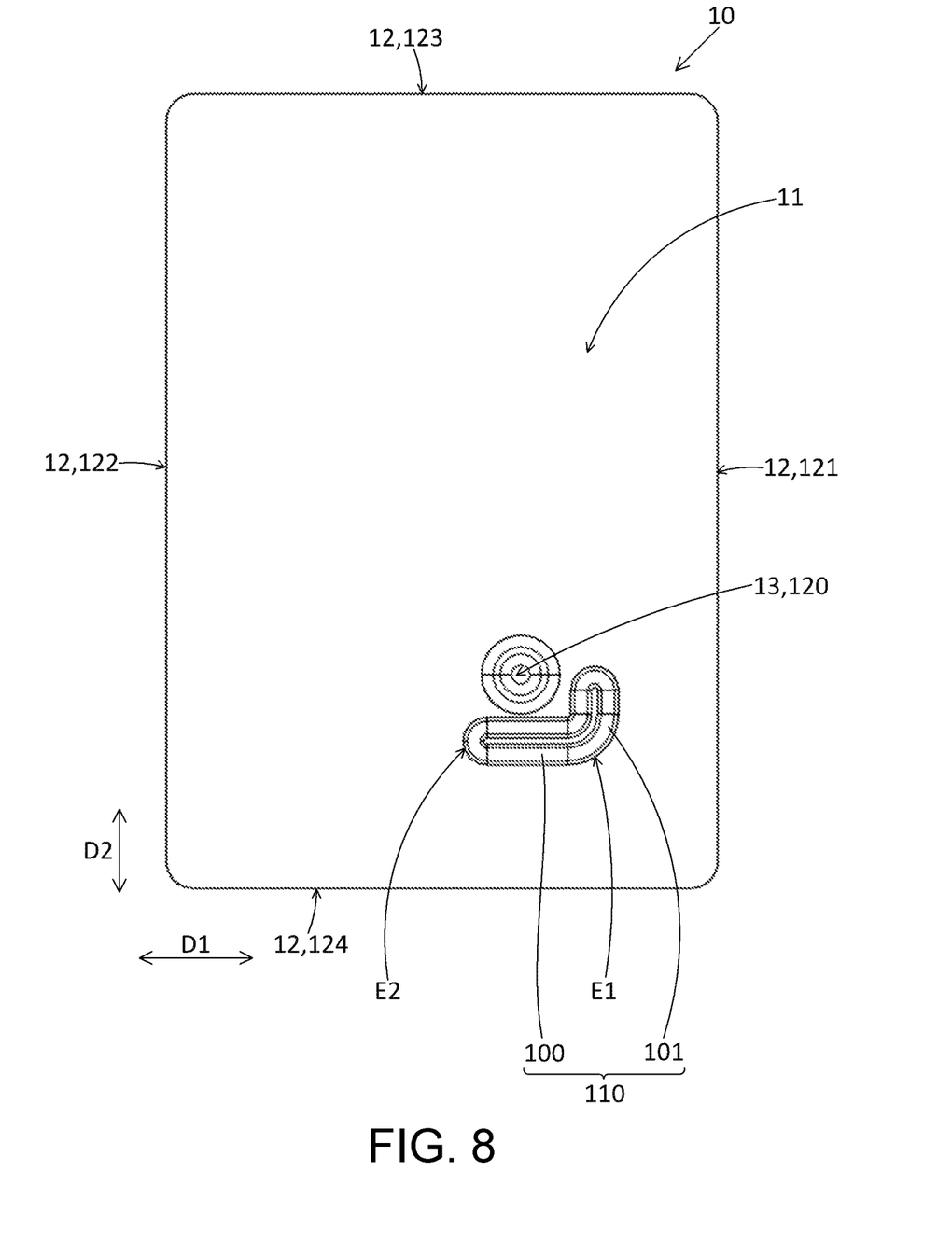
FIG. 8 is a diagram showing a planar shape of a thin bottom composed of a trunk and a first end.

FIG. 4 is a plan view of the bottom plate 11 of the base body 10 according to the embodiment as viewed from below. FIG. 5 is a cross-sectional view of the pivot post 13 and its surroundings according to the embodiment. FIG. 5 schematically shows a cross-sectional structure cut in a plane including the second axis A2. FIG. 6 is a cross-sectional view of a mold 50 used in the casting process of the base plate 1 according to the embodiment. FIG. 6 schematically shows the cross-sectional structure of the mold 50. Further, in FIG. 6, the direction in which the molten metal flows is indicated by an arrow FD. FIG. 7 is a diagram showing a planar shape of a thin bottom 110 composed of only a trunk 100. FIG. 8 is a diagram showing a planar shape of the thin bottom 110 composed of the trunk 100 and a first end 101.

The bottom plate 11 has the thin bottom 110. The thin bottom 110 is arranged in a radially outward direction orthogonal to the second axis A2 of the pivot post 13. Further, the thin bottom 110 has a lower recess 111 that is recessed upward from a lower surface of the bottom plate 11. That is, the thin bottom 110 is a part where the lower surface of the bottom plate 11 is recessed upward, and is a part of the bottom plate 11 having a thin plate thickness. For example, the thin bottom 110 extends in a groove shape. In this configuration, the occurrence of shrinkage cavities in the pivot post 13 can be suppressed. The details will be described below.

In the casting process of the base plate 1 in which the bottom plate 11 has the thin bottom 110, the mold 50 as shown in FIG. 6 is used. The mold 50 has at least a first cavity 51 and a second cavity 52. The first cavity 51 is a cavity corresponding to the pivot post 13, and the second cavity 52 is a cavity corresponding to the thin bottom 110. That is, when the molten metal filled in the first cavity 51 solidifies, the pivot post 13 is formed, and when the molten metal filled in the second cavity 52 solidifies, the thin bottom 110 is formed.

Here, since a region on one side of the second direction D2 of the bottom plate 11 is a region including the first axis A1, the region on one side of the second direction D2 of the bottom plate 11 needs to be made with high accuracy. Therefore, in the casting process of the base plate 1, the molten metal is poured from the side of the mold 50 corresponding to one side of the second direction D2. That is, the molten metal is poured in from the side opposite to the second cavity 52 side with respect to the first cavity 51.

Therefore, part of the molten metal poured into the mold 50 flows to the second cavity 52 through the first cavity 51. At this time, since a width of a mold opening direction D of the second cavity 52 is narrow, the flow of the molten metal into the second cavity 52 is suppressed. That is, the flow of the molten metal in the direction away from the first cavity 51 is suppressed. Accordingly, the molten metal is easily filled in the first cavity 51. Therefore, the first cavity 51 can be sufficiently filled with the molten metal. As a result, the deterioration of the quality of the base plate 1 due to the shrinkage cavities in the pivot post 13 can be suppressed. Further, since the deterioration of the quality of the base plate 1 can be suppressed, the reliability of the disk drive 3 can be improved.

The thin bottom 110 has the trunk 100. The trunk 100 extends from one side of the first direction D1 toward the other side. For example, the trunk 100 extends parallel to the first direction D1. The trunk 100 does not have to be parallel to the first direction D1. That is, the trunk 100 may be tilted with respect to the first direction D1. Further, the trunk 100 is located further toward the other side of the second direction D2 than is the pivot post 13. In other words, the pivot post 13 is located further toward one side of the second direction D2 than is the trunk 100. In this configuration, when the molten metal is poured from the side of the mold 50 corresponding to one side of the second direction D2 in the casting process of the base plate 1, the flow of the molten metal in the direction away from the first cavity 51 can be surely suppressed.

An end E1 of the trunk 100 on one side of the first direction D1 is located further toward one side of the first direction D1 than is the pivot post 13. An end E2 of the trunk 100 on the other side of the first direction D1 is located further toward the other side of the first direction D1 than is the pivot post 13. In other words, a length of the first direction of the trunk D1 100 is larger than a length of the first direction D1 of the pivot post 13, that is, the diameter of the pivot post 13 when viewed from the axial direction. In this configuration, in the casting process of the base plate 1, the flow of the molten metal passing through the first cavity 51 and its surroundings in the direction away from the first cavity 51 can be further suppressed. As a result, the filling of the molten metal into the first cavity 51 is further enhanced, and the occurrence of shrinkage cavities in the pivot post 13 can be further suppressed.

The thin bottom 110 has the first end 101 extending from the end E1 of the trunk 100 on one side of the first direction D1. At least part of the first end 101 is located on one side of the first direction D1 of the pivot post 13. In the casting process of the base plate 1 when the thin bottom 110 has the first end 101, the flow of the molten metal passing through the first cavity 51 in the direction away from the first cavity 51 can be further suppressed. This makes it easier to fill the first cavity 51 with the molten metal. That is, the occurrence of shrinkage cavities in the pivot post 13 can be further suppressed.

The thin bottom 110 has a second end 102 extending from the end E2 of the trunk 100 on the other side of the first direction D1. At least part of the second end 102 is located on the other side of the first direction D1 of the pivot post 13. In the casting process of the base plate 1 when the thin bottom 110 has the second end 102, the flow of the molten metal passing through the first cavity 51 in the direction away from the first cavity 51 can be further suppressed. Thus, the first cavity 51 is more easily filled with the molten metal. That is, the occurrence of shrinkage cavities in the pivot post 13 can be further suppressed.

The first end 101 and the second end 102 extend toward one side of the second direction D2, respectively. However, the first end 101 extends substantially parallel to the second direction D2, while the second end 102 is inclined to the other side of the first direction D1.

As shown in FIG. 7, the thin bottom 110 may be composed of only the trunk 100. As shown in FIG. 8, the thin bottom 110 may be composed of the trunk 100 and the first end 101. Although not shown, the thin bottom 110 may be composed of the trunk 100 and the second end 102.

The lower recess 111 has a lower taper 111A on at least part of a surface facing the radially outward direction orthogonal to the second axis A2. The lower taper 111A has a tapered shape that is inclined in the radially outward direction orthogonal to the second axis A2 from below to above.

Although not shown, in the casting process in the case where the surface of the lower recess 111 facing the radially outward direction orthogonal to the second axis A2 is not inclined, the flow of molten metal from the cavity corresponding to the pivot post 13 to the cavity corresponding to the thin bottom 110 may be obstructed by a steep wall surface, and the flow of the molten metal away from the cavity corresponding to the pivot post 13 may become very poor. On the other hand, in the casting process in the case where the surface of the lower recess 111 facing the radially outward direction orthogonal to the second axis A2 has the lower taper 111A, as shown in FIG. 6, since the wall surface between the first cavity 51 and the second cavity 52 is inclined, the flow of the molten metal in the direction away from the first cavity 51 can be prevented from becoming very poor. The mold releasability of the cast product from the mold 50 is improved, and the quality of the base plate 1 is improved.

For example, the lower recess 111 has the lower taper 111A on all surfaces facing the radially outward direction orthogonal to the second axis A2. Further, for example, the surface of the lower recess 111 facing the radially outward direction orthogonal to the second axis A2 is inclined over the entire surface and does not have a portion extending in parallel with the axial direction.

The surface of the lower recess 111 facing a radially inward direction orthogonal to the second axis A2 is inclined in the radially inward direction orthogonal to the second axis A2 from below to above. Therefore, the lower recess 111 has a shape that tapers from below to above when viewed in a cross section cut in a plane including the second axis A2.

The bottom plate 11 has a pivot post recess 120. The pivot post recess 120 is recessed upward from the lower surface of the bottom plate 11 at a position overlapping the second axis A2. In the configuration in which the bottom plate 11 has the pivot post recess 120, in the casting process of the base plate 1, the molten metal flowing toward the first cavity 51 flows so as to ride on a step just before reaching the first cavity 51. That is, the molten metal goes upward just before reaching the first cavity 51. As a result, the filling of the molten metal into the first cavity 51 is further enhanced.

Figure 9:
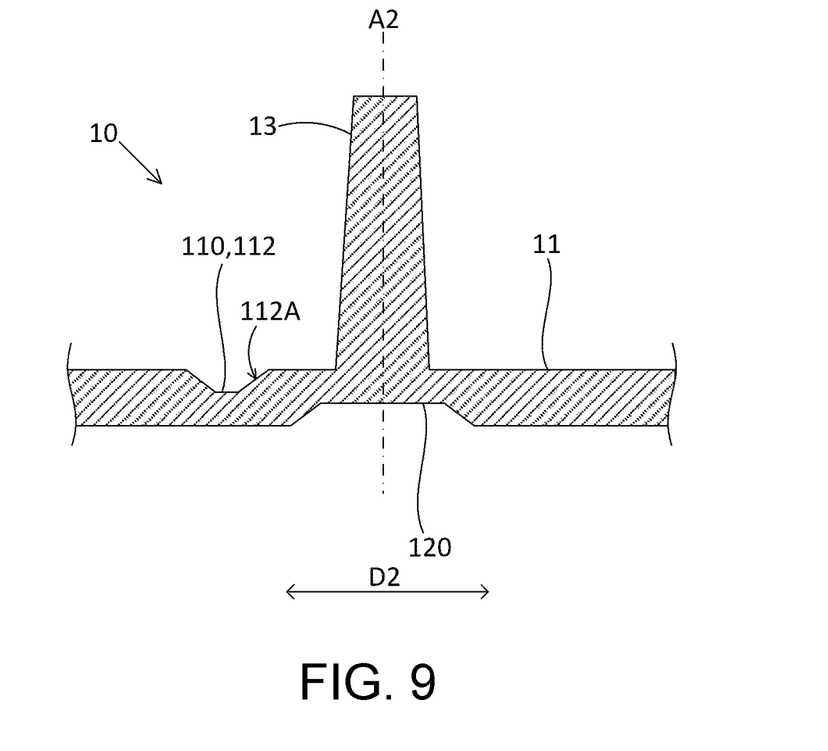
FIG. 9 is a cross-sectional view of a thin bottom of a bottom plate and its surroundings according to a first modification.

FIG. 9 is a cross-sectional view of the thin bottom 110 of the bottom plate 11 and its surroundings according to a first modification.

In the first modification, as shown in FIG. 9, the thin bottom 110 of the bottom plate 11 has an upper recess 112 that is recessed downward from the upper surface of the bottom plate 11. In the first modification, part of the upper surface of the bottom plate 11 is recessed downward, such that the plate thickness of the thin bottom 110 becomes thin.

Although not shown, in the casting process of the base plate 1 in which the thin bottom 110 has the upper recess 112, similar to the casting process of the base plate 1 in which the thin bottom 110 has the lower recess 111, the width of the cavity corresponding to the thin bottom 110 in the mold opening direction among the molds used in the casting process becomes narrow. As a result, the flow of the molten metal in the direction away from the cavity corresponding to the pivot post 13 in the mold is suppressed, such that the cavity corresponding to the pivot post 13 is easily filled with the molten metal. As a result, the same effect as when the thin bottom 110 has the lower recess 111 can be obtained. That is, the occurrence of shrinkage cavities in the pivot post 13 can be suppressed.

The upper recess 112 has an upper taper 112A on at least part of the surface facing the radially outward direction orthogonal to the second axis A2. The upper taper 112A has a tapered shape that is inclined in the radially outward direction orthogonal to the second axis A2 from above to below.

Although not shown, in the casting process when the surface of the upper recess 112 facing the radially outward direction orthogonal to the second axis A2 is not inclined, the flow of molten metal from the cavity corresponding to the pivot post 13 to the cavity corresponding to the thin bottom 110 may be obstructed by a steep wall surface, and the flow of the molten metal away from the cavity corresponding to the pivot post 13 may become very poor. On the other hand, in the casting process in the case where the surface of the upper recess 112 facing the radially outward direction orthogonal to the second axis A2 has the upper taper 112A, since the wall surface between the cavity corresponding to the pivot post 13 and the cavity corresponding to the thin bottom 110 is inclined, the flow of the molten metal from in the direction away from the cavity corresponding to the pivot post 13 can be prevented from becoming very poor. Moreover, the mold releasability of the cast product from the mold is improved, and the quality of the base plate 1 is improved.

For example, the upper recess 112 has the upper taper 112A on all surfaces facing the radially outward direction orthogonal to the second axis A2. Further, for example, the surface of the upper recess 112 facing the radially outward direction orthogonal to the second axis A2 is inclined over the entire surface and does not have a portion extending in parallel with the axial direction.

The surface of the upper recess 112 facing the radially inward direction orthogonal to the second axis A2 is inclined in the radially inward direction orthogonal to the second axis A2 from above to below. Therefore, the upper recess 112 has a shape that tapers from above to below when viewed in a cross section cut by a plane including the second axis A2.

The thin bottom 110 may have only one of the lower recess 111 and the upper recess 112, or may have both the lower recess 111 and the upper recess 112 (not shown). That is, the thin bottom 110 has at least one of the lower recess 111 that is recessed upward from the lower surface of the bottom plate 11 and an upper recess 112 that is recessed downward from the upper surface of the bottom plate 11. Although not shown, in the casting process of the base plate 1 in which the thin bottom 110 has both the lower recess 111 and the upper recess 112, among the molds used in the casting process, the width of the cavity corresponding to the thin bottom 110 in the casting process is narrower in the mold opening direction. As a result, the flow of the molten metal in the direction away from the cavity corresponding to the pivot post 13 in the mold is further suppressed, such that the cavity corresponding to the pivot post 13 is more easily filled with the molten metal. As a result, the occurrence of shrinkage cavities in the pivot post 13 can be further suppressed.

Figure 10:
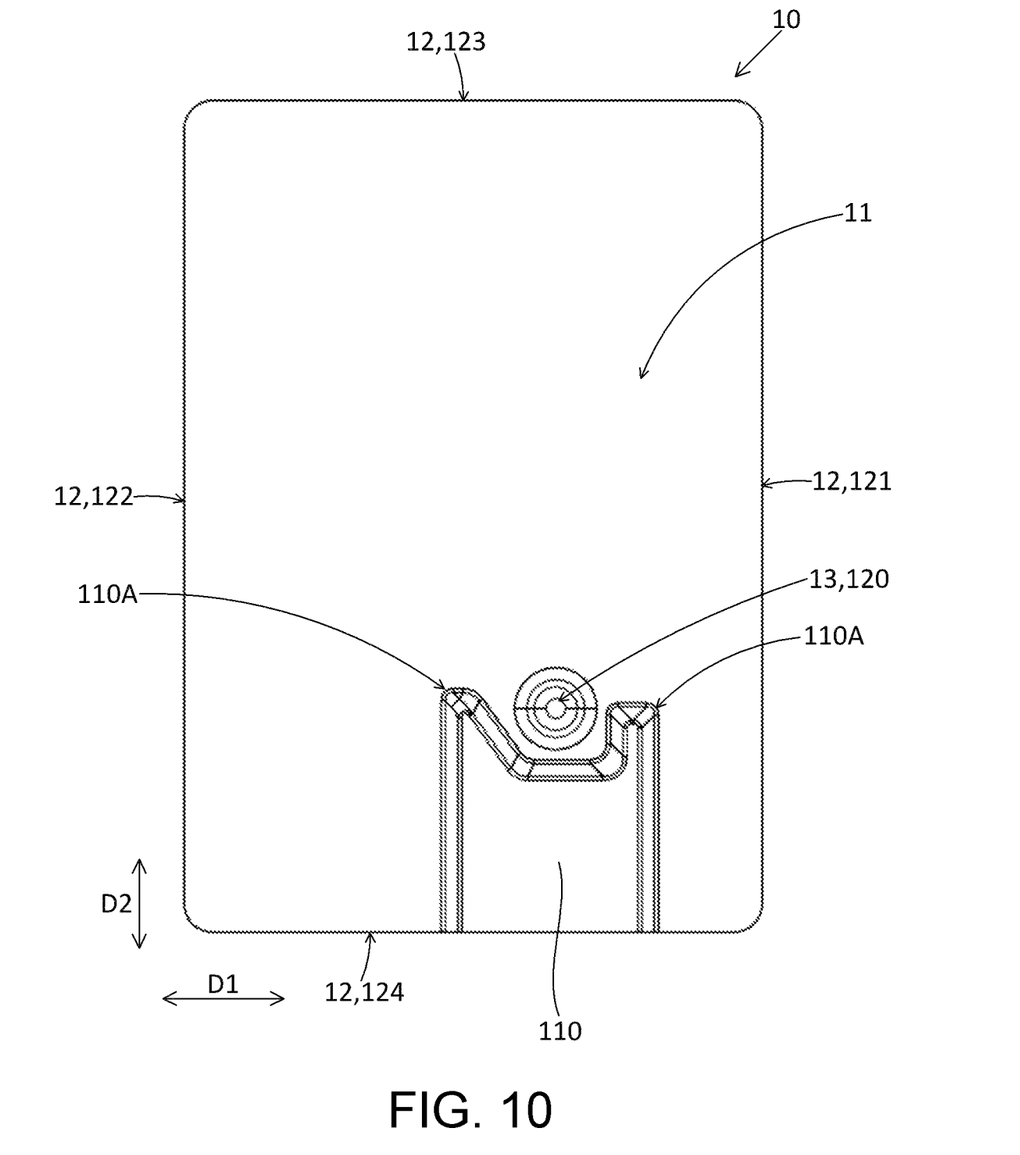
FIG. 10 is a plan view of a bottom plate according to a second modification as viewed from below.

FIG. 10 is a plan view of the bottom plate 11 according to a second modification as viewed from below.

In the second modification, as shown in FIG. 10, the thin bottom 110 extends in the radially outward direction orthogonal to the second axis A2 further toward the other side of the second direction D2 than the pivot post 13, and reaches the outer edge of the bottom plate 11 on the other side of the second direction D2. That is, the thin bottom 110 of the second modification does not have an elongated groove shape.

In the configuration of the second modification, unlike the case where the thin bottom 110 has an elongated groove shape, it is not necessary to locate an elongated groove on a mating surface of the mold used in the casting process of the base plate 1. Thus, the mold used in the casting process of the base plate 1 can be easily manufactured.

In the second modification, the thin bottom 110 has a protrusion 110A protruding to one side of the second direction D2. The protrusion 110A is arranged on at least one of one side and the other side of the first direction D1 of the pivot post 13. For example, the protrusion 110A is arranged on both one side and the other side of the first direction D1 of the pivot post 13.

In the configuration in which the protrusion 110A is arranged on at least one of one side and the other side of the first direction D1 of the pivot post 13, in the casting process of the base plate 1, the flow of molten metal in the direction away from the cavity corresponding to the pivot post 13 can be further suppressed. That is, the molten metal is more easily filled in the cavity corresponding to the pivot post 13. As a result, the occurrence of shrinkage cavities in the pivot post 13 can be further suppressed.

In the manufacturing process including the cast product of the base plate 1, the electrodeposition coating film 20 is coated on the entire surface of the cast product that is the base plate 1. After coating the electrodeposition coating film 20, gate marks and overflow marks of the cast product are then cut. By cutting part of the cast product covered with the electrodeposition coating film 20, the processed surface 10A exposed from the electrodeposition coating film 20 is formed. Therefore, the base body 10 has at least part of the processed surface 10A exposed from the electrodeposition coating film 20.

The base body 10 has the processed surface 10A on an outer surface of the wall 12 (see FIG. 3). The base body 10 has at least the processed surface 10A exposed from the electrodeposition coating film 20 on an outer surface of the first short side wall 123. Hereinafter, the processed surface 10A of the wall 12 will be described with reference to a reference numeral 12A.

Here, in the casting process of the base plate 1, in order to accurately finish the region including the first axis A1 in the bottom plate 11, a gate is provided on the side corresponding to one side of the second direction D2 of the mold used in the casting process, and the molten metal is poured in. That is, at least a gate mark remains on the side corresponding to one side of the second direction D2 of the cast product that is the base plate 1. By cutting the gate marks of this cast product, the base plate 1 having a processed surface 12A on the outer surface of the first short side wall 123 can be obtained. That is, the base plate 1 having the processed surface 12A on the outer surface of the first short side wall 123 has no gate mark.

For example, the base body 10 further has a processed surface 12A exposed from the electrodeposition coating film 20 on at least part of an outer surface of the second short side wall 124, an outer surface of the first long side wall 121, and an outer surface of the second long side wall 122. That is, the outer surface continuous from the outer surface of the first short side wall 123 has the processed surface 12A. For example, in addition to the first short side wall 123, all the outer surfaces of the second short side wall 124, the first long side wall 121, and the second long side wall 122 may have the processed surface 12A.

For example, in the casting process of the base plate 1, which a mold is used which leaves gate marks, overflow marks, and the like on a certain outer surface of the cast product and on an outer surface continuous from the outer surface, after setting the cast product manufactured using the mold in the cutting device, the part of the cast product to be cut can be cut at once. Therefore, the man-hours of the base plate 1 can be reduced.

The base body 10 has the processed surface 10A on an outer peripheral surface of the pivot post 13 (see FIG. 3). That is, the pivot post 13 has the processed surface 10A exposed from the electrodeposition coating film 20 on the outer peripheral surface. Hereinafter, the processed surface 10A of the pivot post 13 will be described with reference to a reference numeral 13A.

The arm 41 of the head 40 is swingably mounted on the pivot post 13. In this configuration, if the coaxiality and cylindricity accuracy of the pivot post 13 is low, the swing of the arm 41 may not be performed accurately, and problems may occur in reading and writing information from/to the disk 30 by the head 40. Therefore, the outer peripheral surface of the pivot post 13, that is, the surface that swingably supports the arm 41 is taken as the processed surface 13A. Thus, the accuracy of the coaxiality and cylindricity of the pivot post 13 can be improved. As a result, it is possible to suppress the occurrence of trouble in reading and writing information from/to the disk 30 by the head 40.

After the casting process of the base plate 1, a cutting process of cutting gate marks, overflow marks, and the like of the cast product is performed to form the processed surface 10A. Here, among the molds used in the casting process, at the gate, air is entrained because the molten metal is poured in. The air is discharged at the overflow part.

Therefore, a part in the cast product where the gate marks and the overflow marks remain has low metal density. Further, a chill layer appears on the surface of the cast product, but the chill layer is removed in the cutting process. Therefore, in the cutting process, a surface of the cast product in which a part having a low metal density is exposed is formed as the processed surface 10A.

Therefore, it is necessary to seal the processed surface 10A. Thus, the manufacturing process of the base plate 1 includes a coating process of impregnating agent to the processed surface 10A of the base body 10. That is, the base body 10 has the impregnating agent infiltrated into at least part of the processed surface 10A. By infiltrating the processed surface 10A with the impregnating agent, the fine cavities located in the base body 10 can be sealed with the impregnating agent. As a result, the helium gas can be prevented from leaking from the base plate 1 which is part of the housing 31 of the disk drive 3.

For example, the impregnating agent is an epoxy resin. Alternatively, the impregnating agent is an acrylic resin. By using the epoxy resin or the acrylic resin as the impregnating agent, the fine cavities located in the base body 10 can be easily sealed with the impregnating agent. The impregnating agent has a lower viscosity than the electrodeposition coating material prior to curing which is the electrodeposition coating film 20. Therefore, the impregnating agent can be impregnated into the fine cavities generated in the base body 10.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The present disclosure is applicable, for example, to disk drives such as hard disk drives.

What is claimed is:
1. A base plate of a cast product that is part of a housing of a disk drive, the base plate comprising:
 a base body, and
 an electrodeposition coating film covering at least part of a surface of the base body, wherein
 the base body comprises:
  a bottom plate, and
  a pivot post;
 the bottom plate
  extends vertically and extends perpendicular to a first axis that is a rotation axis of a disk and to a second axis that extends vertically at a position different from the first axis and serves as a swing axis of a head that performs at least one of reading and writing information from/to the disk, and
  when viewed from an axial direction, has a rectangular shape with a first direction as a short side direction in which a short side extends and a second direction as a long side direction in which a long side extends;
 the pivot post protrudes upward from an upper surface of the bottom plate at a position overlapping the second axis; wherein
 the bottom plate has a pivot post recess, and the pivot post recess is recessed upward from a lower surface of the bottom plate at the position overlapping the second axis, the bottom plate comprises a thin bottom that extends in a groove shape; and the thin bottom
is arranged adjacent to the pivot post recess in an other direction orthogonal to the second axis of the pivot post, and comprises at least one of a lower recess that is recessed upward from a lower surface of the bottom plate and an upper recess that is recessed downward from the upper surface of the bottom plate, a distance between an end of the lower recess on one side and a first long side wall is smaller than a distance between an end of the lower recess on an other side and a second long side wall, wherein a width length of the pivot post recess is larger than a width of the lower recess.

2. The base plate according to claim 1,
wherein the thin bottom comprises a trunk extending from one side to the other side of the first direction,
an end of the trunk on one side of the first direction is located further toward one side of the first direction than is the pivot post,
an end of the trunk on the other side of the first direction is located further toward the other side of the first direction than is the pivot post.

3. The base plate according to claim 2,
wherein the thin bottom comprises a first end extending from the end of the trunk on one side of the first direction, and
at least part of the first end is arranged on one side of the first direction of the pivot post.

4. The base plate according to claim 2,
wherein the thin bottom comprises a second end extending from the end of the trunk on the other side of the first direction, and
at least part of the second end is arranged on the other side of the first direction of the pivot post.

5. The base plate according to claim 2,
wherein the first axis is located further toward one side of the second direction than is to the pivot post, and
the trunk is located further toward the other side of the second direction than is the pivot post.

6. The base plate according to claim 1,
wherein the lower recess comprises a lower taper on at least part of a surface facing a radially outward direction orthogonal to the second axis, the lower taper has a tapered shape that is inclined in the radially outward direction orthogonal to the second axis from below to above, the upper recess comprises an upper taper on at least part of the surface facing the radially outward direction orthogonal to the second axis, and the upper taper has a tapered shape that is inclined in the radially outward direction orthogonal to the second axis from above to below.

7. The base plate according to claim 1,
wherein the base body comprises a wall extending upward from an outer edge of the bottom plate, the wall comprises the first long side wall located on one side of the first direction; the second long side wall located on the other side of the first direction; a first short side wall located on one side of the second direction; and a second short side wall located on the other side of the second direction, and the base body has a processed surface exposed from the electrodeposition coating film on at least part of an outer surface of the first short side wall, an outer surface of the second short side wall, an outer surface of the first long side wall, and an outer surface of the second long side wall.

8. The base plate according to claim 7,
wherein the base body comprises an impregnating agent infiltrated into at least part of the processed surface.

9. The base plate according to claim 8,
wherein the impregnating agent is either an epoxy resin or an acrylic resin.

10. The base plate according to claim 1,
wherein the pivot post has a processed surface exposed from the electrodeposition coating film on an outer peripheral surface.

11. The base plate according to claim 10,
wherein the base body comprises an impregnating agent infiltrated into at least part of the processed surface.

12. The base plate according to claim 11,
wherein the impregnating agent is either an epoxy resin or an acrylic resin.

13. A spindle motor,
comprising the base plate according to claim 1.

14. A disk drive,
comprising the spindle motor according to claim 13.

15. The disk drive according to claim 14,
wherein an inside of the housing is filled with a gas having a density lower than air.

* * * * *